US010102273B2

(12) United States Patent
Lee-Goldman et al.

(10) Patent No.: US 10,102,273 B2
(45) Date of Patent: Oct. 16, 2018

(54) SUGGESTED QUERIES FOR LOCATING POSTS ON ONLINE SOCIAL NETWORKS

(71) Applicant: Facebook, Inc., Menlo Park, CA (US)

(72) Inventors: Russell Lee-Goldman, Oakland, CA (US); Kurchi Subhra Hazra, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 444 days.

(21) Appl. No.: 14/585,782

(22) Filed: Dec. 30, 2014

(65) Prior Publication Data

US 2016/0188702 A1 Jun. 30, 2016

(51) Int. Cl.
*G06Q 30/02* (2012.01)
*G06F 17/30* (2006.01)

(52) U.S. Cl.
CPC .... *G06F 17/3064* (2013.01); *G06F 17/30528* (2013.01); *G06F 17/30598* (2013.01); *G06F 17/30675* (2013.01); *G06F 17/30705* (2013.01); *G06F 17/30867* (2013.01); *G06F 17/30958* (2013.01); *G06Q 30/02* (2013.01)

(58) Field of Classification Search
CPC ........... G06F 17/30675; G06F 17/3064; G06F 17/30528; G06F 17/30598; G06F 17/30705; G06F 17/30867; G06F 17/30958; G06Q 30/02
USPC ....... 707/749, 708, 726, 732, 755, 767, 770, 707/990.005, E17.014
See application file for complete search history.

(56) References Cited

U.S. PATENT DOCUMENTS

| | | |
|---|---|---|
| 5,918,014 A | 6/1999 | Robinson |
| 6,539,232 B2 | 3/2003 | Hendrey |
| 6,957,184 B2 | 10/2005 | Schmid |
| 7,069,308 B2 | 6/2006 | Abrams |
| 7,379,811 B2 | 5/2008 | Rasmussen |
| 7,539,697 B1 | 5/2009 | Akella |
| 7,752,326 B2 | 7/2010 | Smit |
| 7,836,044 B2 | 11/2010 | Kamvar |
| 8,027,990 B1 | 9/2011 | Mysen |
| 8,060,639 B2 | 11/2011 | Smit |
| 8,112,529 B2 | 2/2012 | Van Den Oord |
| 8,180,804 B1 | 5/2012 | Narayanan |
| 8,185,558 B1 | 5/2012 | Narayanan |
| 8,239,364 B2 | 8/2012 | Wable |
| 8,244,848 B1 | 8/2012 | Narayanan |
| 8,271,471 B1 | 9/2012 | Kamvar |
| 8,271,546 B2 | 9/2012 | Gibbs |
| 8,301,639 B1 | 10/2012 | Myllymaki |
| 8,321,364 B1 | 11/2012 | Gharpure |
| 8,364,709 B1 | 1/2013 | Das |

(Continued)

*Primary Examiner* — Alex Gofman
*Assistant Examiner* — Kamal K Dewan
(74) *Attorney, Agent, or Firm* — Baker Botts L.L.P.

(57) ABSTRACT

In one embodiment, a method includes accessing a post of an online social network, extracting keywords from the content of the first post and the metadata associated with the first post, determining topics associated with each extracted keyword, calculating a topic-score based on a relevance of the topic to the post for each topic, generating a suggested keyword query corresponding to the post, the suggested keyword query comprising extracted keywords corresponding to each topic having a topic-score greater than a threshold topic-score, and sending the post and the suggested keyword query to a client device of a first user for display.

36 Claims, 6 Drawing Sheets

(56) References Cited

U.S. PATENT DOCUMENTS

| | | |
|---|---|---|
| 8,386,465 B2 | 2/2013 | Ansari |
| 8,407,200 B2 | 3/2013 | Wable |
| 8,412,749 B2 | 4/2013 | Fortuna |
| 8,538,960 B2 | 9/2013 | Wong |
| 8,572,129 B1 | 10/2013 | Lee |
| 8,595,297 B2 | 11/2013 | Marcucci |
| 8,601,027 B2 | 12/2013 | Behforooz |
| 8,639,725 B1 | 1/2014 | Udeshi |
| 8,732,208 B2 | 5/2014 | Lee |
| 8,751,521 B2 | 6/2014 | Lee |
| 8,782,080 B2 | 7/2014 | Lee |
| 8,868,603 B2 | 10/2014 | Lee |
| 8,918,418 B2 | 12/2014 | Lee |
| 8,935,255 B2 | 1/2015 | Sankar |
| 8,935,271 B2 | 1/2015 | Lassen |
| 2002/0086676 A1 | 7/2002 | Hendrey |
| 2002/0196273 A1 | 12/2002 | Krause |
| 2003/0154194 A1 | 8/2003 | Jonas |
| 2003/0208474 A1 | 11/2003 | Soulanille |
| 2004/0088325 A1 | 5/2004 | Elder |
| 2004/0172237 A1 | 9/2004 | Saldanha |
| 2004/0215793 A1 | 10/2004 | Ryan |
| 2004/0255237 A1 | 12/2004 | Tong |
| 2005/0091202 A1 | 4/2005 | Thomas |
| 2005/0125408 A1 | 6/2005 | Somaroo |
| 2005/0131872 A1 | 6/2005 | Calbucci |
| 2005/0171955 A1 | 8/2005 | Hull |
| 2005/0256756 A1 | 11/2005 | Lam |
| 2006/0136419 A1 | 6/2006 | Brydon |
| 2006/0190436 A1 | 8/2006 | Richardson |
| 2007/0277100 A1 | 11/2007 | Sheha |
| 2007/0288514 A1* | 12/2007 | Reitter ............ G06F 17/30864 |
| 2008/0033926 A1 | 2/2008 | Matthews |
| 2008/0072180 A1 | 3/2008 | Chevalier |
| 2008/0183694 A1 | 7/2008 | Cane |
| 2008/0183695 A1 | 7/2008 | Jadhav |
| 2008/0270615 A1 | 10/2008 | Centola |
| 2008/0294624 A1* | 11/2008 | Kanigsberg ....... G06F 17/30867 |
| 2009/0006543 A1 | 1/2009 | Smit |
| 2009/0083232 A1* | 3/2009 | Ives ................ G06F 17/30864 |
| 2009/0094200 A1 | 4/2009 | Baeza-Yates |
| 2009/0164929 A1 | 6/2009 | Chen |
| 2009/0197681 A1 | 8/2009 | Krishnamoorthy |
| 2009/0228296 A1 | 9/2009 | Ismalon |
| 2009/0265326 A1 | 10/2009 | Lehrman |
| 2009/0281988 A1 | 11/2009 | Yoo |
| 2009/0299963 A1 | 12/2009 | Pippori |
| 2010/0049802 A1 | 2/2010 | Raman |
| 2010/0057723 A1 | 3/2010 | Rajaram |
| 2010/0125562 A1 | 5/2010 | Nair |
| 2010/0179929 A1 | 7/2010 | Yin |
| 2010/0197318 A1 | 8/2010 | Petersen |
| 2010/0228744 A1 | 9/2010 | Craswell |
| 2010/0235354 A1 | 9/2010 | Gargaro |
| 2010/0321399 A1 | 12/2010 | Ellren |
| 2011/0022602 A1 | 1/2011 | Luo |
| 2011/0035377 A1* | 2/2011 | Wang ................ G06F 17/3071 707/737 |
| 2011/0035381 A1* | 2/2011 | Thompson ........ G06F 17/30707 707/740 |
| 2011/0078166 A1 | 3/2011 | Oliver |
| 2011/0087534 A1 | 4/2011 | Strebinger |
| 2011/0093455 A1* | 4/2011 | Benyamin ........ G06F 17/30864 707/723 |
| 2011/0113349 A1* | 5/2011 | Kiciman ............ G06F 17/241 715/753 |
| 2011/0137902 A1 | 6/2011 | Wable |
| 2011/0191371 A1 | 8/2011 | Elliott |
| 2011/0196855 A1 | 8/2011 | Wable |
| 2011/0276396 A1 | 11/2011 | Rathod |
| 2011/0313992 A1 | 12/2011 | Groeneveld |
| 2011/0320470 A1 | 12/2011 | Williams |
| 2012/0059708 A1 | 3/2012 | Galas |
| 2012/0136852 A1 | 5/2012 | Geller |
| 2012/0166432 A1 | 6/2012 | Tseng |
| 2012/0166433 A1 | 6/2012 | Tseng |
| 2012/0179637 A1 | 7/2012 | Juan |
| 2012/0185486 A1 | 7/2012 | Voigt |
| 2012/0209832 A1 | 8/2012 | Neystadt |
| 2012/0221581 A1 | 8/2012 | Narayanan |
| 2012/0271831 A1 | 10/2012 | Narayanan |
| 2012/0278127 A1 | 11/2012 | Kirakosyan |
| 2012/0284329 A1 | 11/2012 | Van Den Oord |
| 2012/0296991 A1* | 11/2012 | Spivack ................ G06Q 10/10 709/206 |
| 2012/0310922 A1* | 12/2012 | Johnson ............ G06F 17/30867 707/722 |
| 2012/0311034 A1 | 12/2012 | Goldband |
| 2012/0323900 A1* | 12/2012 | Patel ................ G06F 17/30781 707/723 |
| 2012/0331063 A1 | 12/2012 | Rajaram |
| 2013/0031106 A1 | 1/2013 | Schechter |
| 2013/0036112 A1* | 2/2013 | Poon ................ G06F 17/30864 707/723 |
| 2013/0041876 A1 | 2/2013 | Dow |
| 2013/0066876 A1 | 3/2013 | Raskino |
| 2013/0086057 A1 | 4/2013 | Harrington |
| 2013/0124538 A1 | 5/2013 | Lee |
| 2013/0124542 A1 | 5/2013 | Lee |
| 2013/0144899 A1 | 6/2013 | Lee |
| 2013/0191372 A1 | 7/2013 | Lee |
| 2013/0191416 A1 | 7/2013 | Lee |
| 2013/0198219 A1 | 8/2013 | Cohen |
| 2013/0226918 A1 | 8/2013 | Berkhim |
| 2013/0246404 A1 | 9/2013 | Annau |
| 2014/0040297 A1* | 2/2014 | Ozonat ............ G06F 17/30616 707/758 |
| 2014/0108428 A1* | 4/2014 | Luo ........................ G06Q 10/10 707/748 |
| 2014/0289231 A1* | 9/2014 | Palmert ............ G06F 17/30719 707/723 |
| 2014/0365460 A1* | 12/2014 | Portnoy ............ G06F 17/30867 707/710 |

\* cited by examiner

SUGGESTED QUERIES FOR LOCATING POSTS ON ONLINE SOCIAL NETWORKS

TECHNICAL FIELD

This disclosure generally relates to social graphs and performing searches for objects within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, the social-networking system may access a post of an online social network and extract one or more keywords from the post. The post may include content (e.g., the text of the post) and metadata (e.g., name of the post's author, the title and blurb of any external webpage linked in the post) of the post. In particular embodiments, the social networking system may access the comments associated with a post (including content and metadata of the comments) and extract one or more keywords from the comments. In particular embodiments, the social-networking system may determine, for each extracted keyword, one or more appropriate topics associated with the extracted keyword (e.g., determining that an extracted keyword "cia" refers to "Central Intelligence Agency" and further determining that it does not refer to "Culinary Institute of America"). This determination may be made based on a context of the extracted keyword in the post. In particular embodiments, the social-networking system may calculate, for each topic, a topic-score based on a relevance of the topic to the post (based on, for example, the number of occurrences of that topic in the post or an overall context of the post).

In particular embodiments, the social-networking system may generate a suggested keyword query corresponding to the post. The suggested keyword query may include one or more extracted keywords corresponding to each topic having a topic-score greater than a threshold topic-score. In particular embodiments, the social-networking system may send to a user the post and the suggested keyword query corresponding to the post. In particular embodiments, the social-networking system may verify that the suggested keyword query retrieves the post for which the suggested keyword query was displayed to the user (i.e., the original post) or that the suggested keyword query retrieves a related post. The social-networking system may perform backend searches verifying several possible keyword queries to determine which keyword query to suggest. In particular embodiments, the social-networking system may receive, from a user's client device, a search query comprising the suggested keyword query. The social-networking system may, in response, generate search results that may include a reference to the original post or to a related post.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
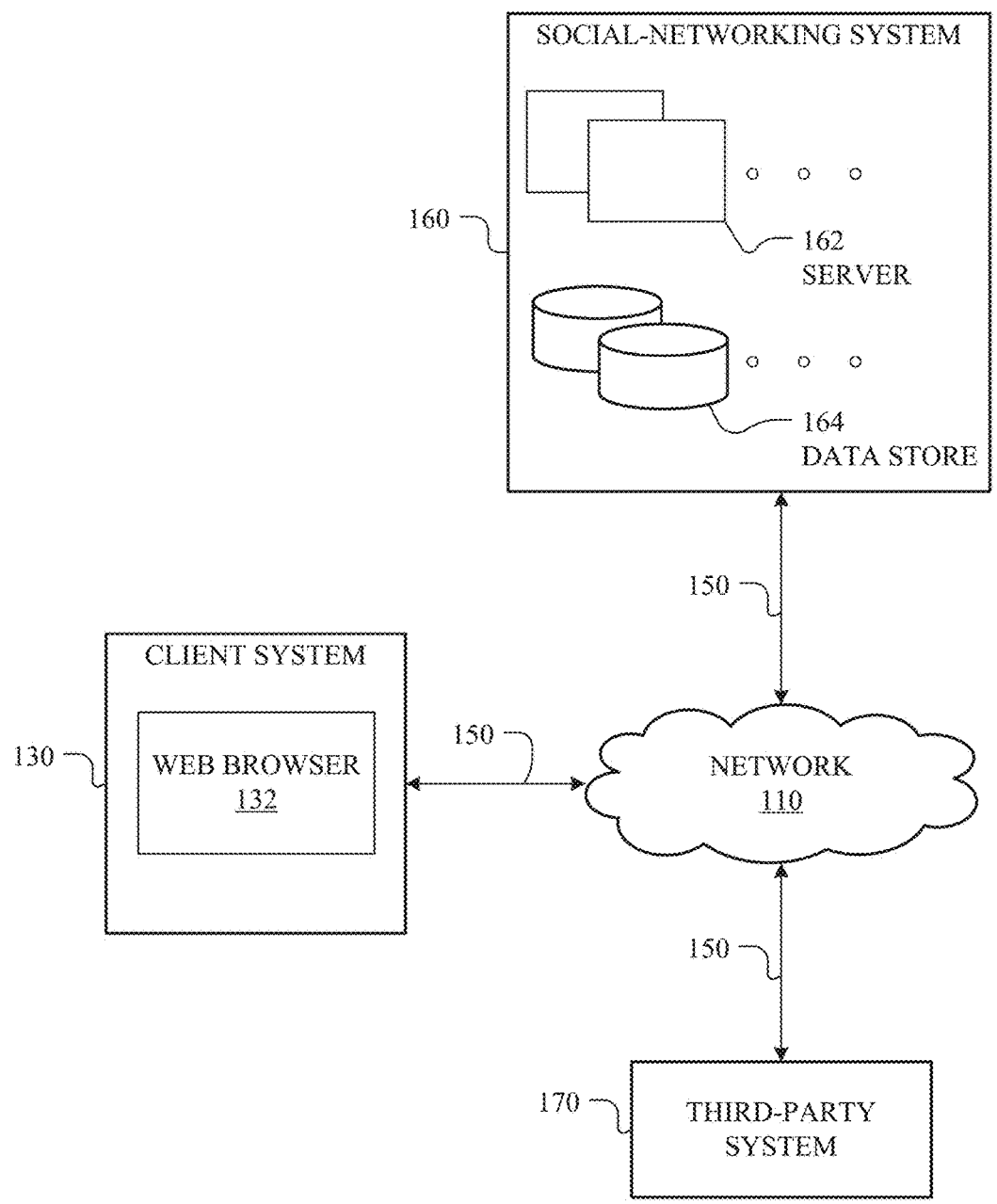
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
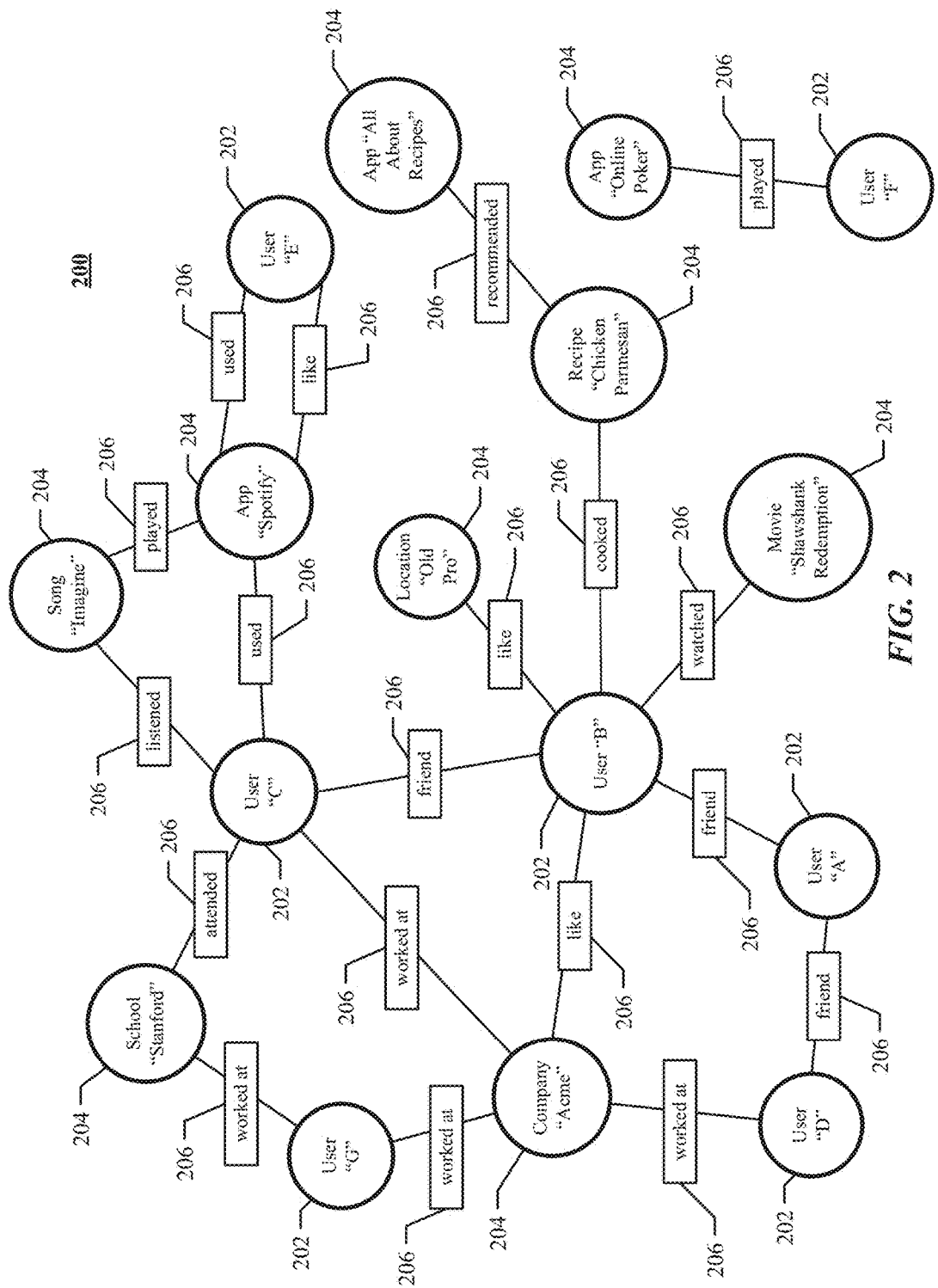
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Search Queries on Online Social Networks

In particular embodiments, a user may submit a query to the social-networking system 160 by, for example, selecting a query input or inputting text into query field. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into a query field to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify resources or content (e.g., user-profile pages, content-profile pages, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 202, concept nodes 204, edges 206), profile pages, external webpages, or any combination thereof. The social-networking system 160 may then generate a search-results page with search results corresponding to the identified content and send the search-results page to the user. The search results may be presented to the user, often in the form of a list of links on the search-results page, each link being associated with a different page that contains some of the identified resources or content. In particular embodiments, each link in the search results may be in the form of a Uniform Resource Locator (URL) that specifies where the corresponding page is located and the mechanism for retrieving it. The social-networking system 160 may then send the search-results page to the web browser 132 on the user's client system 130. The user may then click on the URL links or otherwise select the content from the search-results page to access the content from the social-networking system 160 or from an external system (such as, for example, a third-party system 170), as appropriate. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources. Although this disclosure describes querying the social-networking system 160 in a particular manner, this disclosure contemplates querying the social-networking system 160 in any suitable manner.

Typeahead Processes and Queries

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested page (such as, for example, a user-profile page, a concept-profile page, a search-results page, a user interface of a native application associated with the online social network, or another suitable page of the online social network), which may be hosted by or accessible in the social-networking system 160. In particular embodiments, as a user is entering text to make a declaration, the typeahead feature may attempt to match the string of textual characters being entered in the declaration to strings of characters (e.g., names, descriptions) corresponding to users, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element. In particular embodiments, as the user enters characters into a form box, the typeahead process may read the string of entered textual characters. As each keystroke is made, the frontend-typeahead process may send the entered character string as a request (or call) to the backend-typeahead process executing within social-networking system 160. In particular embodiments, the typeahead process may use one or more matching algorithms to attempt to identify matching social-graph elements. In particular embodiments, when a match or matches are found, the typeahead process may send a response to the user's client system 130 that may include, for example, the names (name strings) or descriptions of the matching social-graph elements as well as, potentially, other metadata associated with the matching social-graph elements. As an example and not by way of limitation, if a user enters the characters "pok" into a query field, the typeahead process may display a drop-down menu that displays names of matching existing profile pages and respective user nodes 202 or concept nodes 204, such as a profile page named or devoted to "poker" or "pokemon," which the user can then click on or otherwise select thereby confirming the desire to declare the matched user or concept name corresponding to the selected node.

More information on typeahead processes may be found in U.S. patent application Ser. No. 12/763,162, filed 19 Apr. 2010, and U.S. patent application Ser. No. 13/556,072, filed 23 Jul. 2012, which are incorporated by reference.

In particular embodiments, the typeahead processes described herein may be applied to search queries entered by a user. As an example and not by way of limitation, as a user enters text characters into a query field, a typeahead process may attempt to identify one or more user nodes 202, concept nodes 204, or edges 206 that match the string of characters entered into the query field as the user is entering the characters. As the typeahead process receives requests or calls including a string or n-gram from the text query, the typeahead process may perform or cause to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu that displays names of matching existing profile pages and respective user nodes 202 or concept nodes 204, and displays names of matching edges 206 that may connect to the matching user nodes 202 or concept nodes 204, which the user can then click on or otherwise select thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu. The user may then confirm the auto-populated declaration simply by keying "enter" on a keyboard or by clicking on the auto-populated declaration. Upon user confirmation of the matching nodes and edges, the typeahead process may send a request that informs the social-networking system 160 of the user's confirmation of a query containing the matching social-graph elements. In response to the request sent, the social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, and U.S. patent application Ser. No. 12/978,265, filed 23 Dec. 2010, which are incorporated by reference.

Structured Search Queries

In particular embodiments, in response to a text query received from a first user (i.e., the querying user), the social-networking system 160 may parse the text query and identify portions of the text query that correspond to particular social-graph elements. However, in some cases a query may include one or more terms that are ambiguous, where an ambiguous term is a term that may possibly correspond to multiple social-graph elements. To parse the ambiguous term, the social-networking system 160 may access a social graph 200 and then parse the text query to identify the social-graph elements that corresponded to ambiguous n-grams from the text query. The social-networking system 160 may then generate a set of structured queries, where each structured query corresponds to one of the possible matching social-graph elements. These structured queries may be based on strings generated by a grammar model, such that they are rendered in a natural-language syntax with references to the relevant social-graph elements. As an example and not by way of limitation, in response to the text query, "show me friends of my girlfriend," the social-networking system 160 may generate a structured query "Friends of Stephanie," where "Friends" and "Stephanie" in the structured query are references corresponding to particular social-graph elements. The reference to "Stephanie" would correspond to a particular user node 202 (where the social-networking system 160 has parsed the n-gram "my girlfriend" to correspond with a user node 202 for the user "Stephanie"), while the reference to "Friends" would correspond to friend-type edges 206 connecting that user node 202 to other user nodes 202 (i.e., edges 206 connecting to "Stephanie's" first-degree friends). When executing this structured query, the social-networking system 160 may identify one or more user nodes 202 connected by friend-type edges 206 to the user node 202 corresponding to "Stephanie". As another example and not by way of limitation, in response to the text query, "friends who work at facebook," the social-networking system 160 may generate a structured query "My friends who work at Facebook," where "my friends," "work at," and "Facebook" in the structured query are references corresponding to particular social-graph elements as described previously (i.e., a friend-type edge 206, a work-at-type edge 206, and concept node 204 corresponding to the company "Facebook"). By providing suggested structured queries in response to a user's text query, the social-networking system 160 may provide a powerful way for users of the online social network to search for elements represented in the social graph 200 based on their social-graph attributes and their relation to various social-graph elements. Structured queries may allow a querying user to search for content that is connected to particular users or concepts in the social graph 200 by particular edge-types. The structured queries may be sent to the first user and displayed in a drop-down menu (via, for example, a client-side typeahead process), where the first user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. Although this disclosure describes generating particular structured queries in a particular manner, this disclosure contemplates generating any suitable structured queries in any suitable manner.

More information on element detection and parsing queries may be found in U.S. patent application Ser. No. 13/556,072, filed 23 Jul. 2012, U.S. patent application Ser. No. 13/731,866, filed 31 Dec. 2012, and U.S. patent application Ser. No. 13/732,101, filed 31 Dec. 2012, each of which is incorporated by reference. More information on structured search queries and grammar models may be found in U.S. patent application Ser. No. 13/556,072, filed 23 Jul. 2012, U.S. patent application Ser. No. 13/674,695, filed 12 Nov. 2012, and U.S. patent application Ser. No. 13/731,866, filed 31 Dec. 2012, each of which is incorporated by reference.

Generating Keywords and Keyword Queries

In particular embodiments, social-networking system 160 may provide customized keyword completion suggestions to a querying user as the user is inputting a text string into a query field. Keyword completion suggestions may be provided to the user in a non-structured format. In order to generate a keyword completion suggestion, the social-networking system 160 may access multiple sources within the social-networking system 160 to generate keyword completion suggestions, score the keyword completion suggestions from the multiple sources, and then return the keyword completion suggestions to the user. As an example and not by way of limitation, and as described further below, if a user types the query "friends stan," then the social-networking system 160 may suggest, for example, "friends stanford," "friends stanford university," "friends stanley," "friends stanley cooper," "friends stanley kubrick," "friends stanley cup," and "friends stanlonski." In this example, the social-networking system 160 is suggesting the keywords which are modifications of the ambiguous n-gram "stan," where the suggestions may be generated from a variety of keyword generators. The social-networking system 160 may have selected the keyword completion suggestions because the user is connected in some way to the suggestions. As an example and not by way of limitation, the querying user may be connected within social graph 200 to the concept node 204 corresponding to Stanford University, for example by like- or attended-type edges 206. The querying user may also have a friend named Stanley Cooper. Although this disclosure describes generating keyword completion suggestions in a particular manner, this disclosure contemplates generating keyword completion suggestions in any suitable manner.

More information on keyword queries may be found in U.S. patent application Ser. No. 14/244,748, filed 3 Apr. 2014, U.S. patent application Ser. No. 14/470,607, filed 27 Aug. 2014, and U.S. patent application Ser. No. 14/561,418, filed 5 Dec. 2014, each of which is incorporated by reference.

Suggested Queries for Locating Posts

Figure 3:
FIG. 3 illustrates an example feed post and suggested keyword query.
Figure 4:
FIG. 4 illustrates an example news post and suggested keyword query.

FIGS. 3 and 4 illustrate example posts of the online social network. In particular embodiments, social-networking system 160 may generate and send to a user suggested keyword queries for locating posts on an online social network. Although this disclosure describes generating suggested keyword queries, this disclosure contemplates generating any suitable queries (such as, for example, suggested structured queries). Social-networking system 160 may extract keywords from a post or from comments associated with the post and determine the keywords that would, based on a system of scoring associated topics, generate the appropriate posts as search results in response to a future search query by the user. The term "posts" as used herein may include news posts, feed posts, other types of posts associated with the online social network, or any combination thereof. A news post may be a post created by an author that is a known news provider (e.g., a post by the cable news network CNN on the online social network, as illustrated in FIG. 4), an author who is not a known news provider that includes a link to a known news website (e.g., a user's post with a link to an article on CNN.com), or another suitable non-person author that includes news content (e.g., a post by the company Samsung on the online social network that includes a link to its website regarding the release of a new phone). A feed post may be a post created by a user of the online social network including text, multimedia content, and links to third-party content that is not news content (e.g., a post by a user about Black Friday deals, i.e., shopping deals on the day after the Thanksgiving holiday in the United States, as illustrated in FIG. 3). Although this disclosure describes generating and sending particular keywords from particular posts and comments in a particular manner, this disclosure contemplates generating and sending any suitable keywords from any suitable posts or comments in any suitable manner. Additionally, while this disclosure focuses on generating suggested keyword queries in the context of finding posts, the functionality described below could be used to generate suggested keyword queries for any type of content on an online social network, such as videos, photos, messages, profiles, etc.

In particular embodiments, social-networking system 160 may access one or more posts of an online social network. The posts may be accessed, for example, in response to a user accessing a particular page (e.g. a newsfeed page) or view state (e.g., a user interface of a native application displaying a newsfeed) of the online social network. Posts may be authored by users or entities associated with the online social network. A post may comprise a content of the post and metadata associated with the post. As an example and not by way of limitation, referencing FIG. 3, social-networking system 160 may access a feed post about Black Friday deals. Post 320 may have been created by a user author (e.g., the user "John"). The content of post 320 may include the text of post 320 (e.g., "Best Black Friday deals I found so far . . . "). The metadata associated with a post may include the name of the post's author, the date and time associated with the post, the number of "likes" associated with the post, the number of shares of the post, or the number of views of the post. The metadata associated with the post may also include blurbs and titles of any external webpage linked in the post, as well as information regarding the authors, topics, or sponsorship associates with the post and/or external content (which may either be retrieved from the external content or provided by the external content provider as pre-tagged information associated with the post). In particular embodiments, social-networking system 160 may access the content and metadata of comments associated with a post. As an example and not by way of limitation, the content associated with comment 330 may include the text inputted by the author of the comment (e.g., "I haven't done any Black Friday shopping before . . . "), and the metadata associated with comment 330 may include the name of the author of comment 330 (e.g., the user "Thomas"), the date and time associated with comment 330, the number of "likes" associated with comment 330, or the title and blurb of any external webpage linked in comment 330. Although this disclosure describes accessing particular posts in a particular manner, this disclosure contemplates accessing any suitable posts in any suitable manner.

In particular embodiments, social-networking system 160 may extract one or more keywords from the content of the post and the metadata associated with the post. The extracting of keywords may involve, for example, social-networking system 160 parsing the content of the post and the metadata associated with the post to identify one or more n-grams that may then be extracted as keywords. In general, an n-gram may be a contiguous sequence of n items from a given sequence of text. The items may be characters, phonemes, syllables, letters, words, base pairs, prefixes, or other identifiable items from the sequence of text or speech. The n-gram may include one or more characters of text (letters, numbers, punctuation, etc.) in the content of a post or the metadata associated with the post. In particular embodiments, each n-gram may include a character string (e.g., one or more characters of text). In particular embodiments, an n-gram may include more than one word. As an example and not by way of limitation, referencing FIG. 3, social-networking system 160 may parse some or all of the text of the content of post 320 (e.g., "Best Black Friday deals . . . ") to identify n-grams that may be extracted as keywords. Social-networking system 160 may identify, among others, the following n-grams: best; black; best black; friday; black friday; best black friday; deals; deal; black friday deals. The n-grams "black friday" and "deals" may then be extracted as keywords. As another example and not by way of limitation, social-networking system 160 may parse some or all of the text from the name of the author of post 320 (e.g., "john"), other suitable content or metadata associated with the post (e.g., "november," the month the post was created; links in the post), or any combination thereof. In particular embodiments, content and metadata from a post's comments may also be extracted. As an example and not by way of limitation, referencing FIG. 3, social-networking system 160 may extract, as keywords, some or all of the text of comment 330 (e.g., "deals" and "shopping"), the name of the author of comment 330 (e.g., "thomas"), other suitable content associated with comment 330, or any combination thereof. In particular embodiments, social-networking system 160 may extract keywords and keyword phrases from a post based on a term frequency-inverse document frequency (TF-IDF) analysis of the content of the post in relation to a set of posts. The TF-IDF is a statistical measure used to evaluate how important a word is to a document (e.g., a post) in a collection or corpus (e.g., a set of posts). The importance increases proportionally to the number of times a word appears in a particular document, but is offset by the frequency of the word in the corpus of documents. The importance of a word in a particular document is based in part on the term count in a document, which is simply the number of times a given term (e.g., a word) appears in the document. This count may be normalized to prevent a bias towards longer documents (which may have a higher term count regardless of the actual importance of that term in the document) and to give a measure of the importance of the term t within the particular document d. Thus we have the term frequency tf(t,d), defined in the simplest case as the occurrence count of a term in a document. The inverse-document frequency (idf) is a measure of the general importance of the term which is obtained by dividing the total number of documents by the number of documents containing the term, and then taking the logarithm of that quotient. A high weight in TF-IDF is reached by a high term frequency in the given document and a low document frequency of the term in the whole collection of documents; the weights hence tend to filter out common terms. In particular embodiments, a TF-IDF analysis may be used to determine one or more keywords from the n-grams included in the content of a post. As an example and not by way of limitation, referencing FIG. 3, a TF-IDF analysis of the text of post 320 may determine that the n-grams "black friday" and "deals" should be extracted as keywords, where these n-grams have high importance within post 320. Similarly, a TF-IDF analysis of post 320 may determine that the n-grams "for," "so," and "I" should not be extracted as keywords, where these n-grams have a low importance within post 320 (because these are common terms in many posts). Although this disclosure describes extracting particular keywords from particular content and metadata in a particular manner, this disclosure contemplates extracting any suitable keywords from any suitable place in any suitable manner.

In particular embodiments, social-networking system 160 may determine, for each extracted keyword, one or more topics associated with the extracted keyword. The one or more topics may be selected from a subject dictionary of social-networking system 160. The subject dictionary may include a set of interconnected nodes, which represent topics, connected by edges representing relatedness between the nodes. Social-networking system 160 may create the subject dictionary once, updating the dictionary organically over time, or may create a new dictionary from scratch periodically. In particular embodiments, social-networking system 160 may create a subject dictionary based on a publicly available database, such as Wikipedia.org. Social-networking system 160 may determine the one or more topics associated with each extracted keyword by matching each extracted keyword with one or more appropriate nodes in the subject dictionary. Topic association involves discriminating among various possible topics to determine the most appropriate topic for a keyword. More information on topic association may be found in U.S. patent application Ser. No. 13/167,701, filed 23 Jun. 2011, which is incorporated by reference. As an example and not by way of limitation, referencing FIG. 4, social-networking system 160 may determine that the extracted keyword "cia" is associated with the topic "Central Intelligence Agency" and not the topic "Culinary Institute of America." In particular embodiments, social-networking system 160 may determine that a keyword includes more than one word (i.e., a keyword may also include keyword phrases). As an example, and not by way of limitation, referencing FIG. 3, social-networking system 160 may determine that "black friday," as used in the post, is a single keyword by determining that the context of the post is associated with the topic "Black Friday" and not to the topics "Black" and "Friday" individually. In particular embodiments, social-networking system 160 may associate topics with extracted keywords that are misspellings (e.g., referencing FIG. 3, it may associate the topic corresponding to the coffee and tea store Lollicup with the misspelled keyword "lolicup"), variations (e.g., "Doughnut" with "donut"), nicknames (e.g., "McDonalds" with "mickey d's), or abbreviations (e.g., "Facebook" with "fb") of the topics.

In particular embodiments, social-networking system 160 may determine the one or more topics that are to be associated with an extracted keyword based on a context of the extracted keyword. In determining the context of the extracted keyword, social-networking system 160 may first receive an electronic topic index comprising a set of objects. This set of objects may be a set of nodes within a subject dictionary, each node corresponding to a topic. Social-networking system 160 may determine a context of the extracted keyword in the post by, for example, calculating a context-score for each object of the set of objects based on the determined context. Social-networking system 160 may determine whether there is an object having a context-score greater than a threshold context-score. If such an object exists, social-networking system 160 may determine that the one or more topics represented by the object are associated with the extracted keyword. The context-score may be a rank, and the threshold context-score may be a threshold rank (e.g., only topics represented by objects ranked in the top three may be associated with the extracted keyword). As an example and not by way of limitation, referencing FIG. 4, in determining the one or more topics that are to be associated with the extracted keyword "cia," social-networking system 160 may receive an electronic topic index including a set of objects, such as a concept node that represents the topic "Central Intelligence Agency" and a concept node that represents the topic "Culinary Institute of America." Social-networking system 160 may determine a context of the extracted keyword "cia" in the post (e.g., by a forward-backward algorithm as described below). Social-networking system 160 may calculate context-scores for concept node "Central Intelligence Agency" and for concept node "Culinary Institute of America." Based on the context of the extracted keyword "cia" in post 420, social-networking system 160 may give a higher context-score to "Central Intelligence Agency" than to "Culinary Institute of America," such that only "Central Intelligence Agency" may have a context-score greater than a threshold context-score. As a result, social-networking system 160 may determine that the extracted keyword "cia" is associated with the topic "Central Intelligence Agency." In particular embodiments, social-networking system 160 may determine the context of the extracted keyword by using a forward-backward algorithm to calculate a probability of the extracted keyword matching the topic based on adjacent n-grams that match the topic also being present. Social-networking system 160, in determining the context of an extracted keyword, may determine all topics that match the n-grams that are adjacent to the extracted keyword and compare them with all topics that match the extracted keyword. Social-networking system 160 may determine that there is a higher probability that the extracted keyword matches a particular topic if adjacent n-grams also match the same topic. In particular embodiments, social-networking system 160 may determine that there is a higher probability that the extracted keyword matches a particular topic if there are more adjacent n-grams that match the topic. As an example, and not by way of limitation, referencing FIG. 3, social-networking system 160, in determining the context of extracted keyword "tv" from the content of post 320 (e.g., "$400 for 42" 4K resolution TV (Newegg)"), may consider which topics the extracted keyword "tv" has in common with adjacent n-grams to determine the context in which the extracted keyword "tv" is being used. For example, social-networking system 160 may determine all topics matching the adjacent n-gram "resolution" and compare them to all topics matching the extracted keyword "tv." Social-networking system 160 may find that the extracted keyword "tv" and the adjacent n-gram "resolution" may both be matched with the topic "Television." The social-networking system 160 may then determine that the context of the extracted keyword in the post is related to the topic "Television" and not to another topic such as "Terminal Velocity," with which the adjacent n-gram "resolution" may not be matched. In particular embodiments, the n-grams whose topics may be compared with those of the extracted keywords are not restricted to the n-grams that are immediately adjacent to the extracted keyword. Rather, as an example, they may be several n-grams away in proximity to the extracted keyword. In particular embodiments, social-networking system 160 may compare the topics of all the n-grams in the content of the post with the topics of the extracted keyword. In particular embodiments, social-networking system 160 may also base its determination of the context of an extracted keyword on a count of the number of related topics there are between the extracted keyword and the other n-grams in the post. In particular embodiments, social-networking system 160 may compare the topics of n-grams in the metadata of the post. In particular embodiments, social-networking system 160 may compare the topics of n-grams in the content and metadata of comments associated with a post. Although this disclosure describes determining particular topics from particular keywords in a particular manner, this disclosure contemplates determining any suitable topics from any suitable keywords in any suitable manner.

In particular embodiments, social-networking system 160 may calculate, for each topic, a topic-score based on a relevance of the topic to the post. Social-networking system 160 may determine the relevance of a topic based on the number of occurrences of that topic in the post. As an example and not by way of limitation, referencing FIG. 3, social-networking system 160 may determine that the topic "Black Friday" is particularly relevant to post 320 because there may be a high number of occurrences of keywords in post 320 with "Black Friday" as an associated topic. For example, social-networking system 160 may determine that there are two occurrences of the topic "Black Friday" if it determines that the two occurrences of the keyword "black friday"—once in the text of post 320 (e.g., "Best Black Friday deals I found so far . . . ") and once in the text of comment 330 (e.g., "I haven't done any Black Friday shopping before . . . ")—are both associated with the topic "Black Friday." Social-networking system 160 may determine that there are even more occurrences if it is determined that other keywords like "deals," "newegg," and "best buy" also have associations with the topic "Black Friday." In particular embodiments, the relevance of the topic to the post is based on an overall context of the post. The overall context of the post may be based on the number of occurrences of topics associated with a significant portion of the extracted keywords, which may come from the post or from comments associated with the post. As an example and not by way of limitation, a post where a large majority of the extracted keywords are associated with the topic "Black Friday" may be determined to have an overall context of Black Friday or shopping. Social-networking system 160 may compare each topic associated with an extracted keyword with the overall context in assigning the topic a topic-score. A topic that is closely related to the overall context of the post may be assigned a higher topic-score than a topic that is not as closely related to the overall context of the post. As an example and not by way of limitation, referencing FIG. 4, social-networking system 160 may determine that the overall context of post 420 (e.g., by determining the topics associated with post 420 and comment 430) is the 2012 attack on the American diplomatic compound in Benghazi, which may have several related topics on the online social network such as "Benghazi Attack" and "Benghazi American Compound." Social-networking system 160 may determine a topic-score for each topic associated with each extracted keyword by determining how closely related the topic is with the topics "Benghazi Attack" and "Benghazi American Compound." In particular embodiments, a topic may be deemed less relevant (and the topic-score is correspondingly decreased) if the one or more keywords associated with the topic are merely part of a list of keywords with similar topics. As an example and not by way of limitation, referencing FIG. 3, the topic-scores for the topics "Newegg," "Target," "Fry's," "Best Buy," and "Lollicup" may be decreased if it is determined that the one or more keywords associated with each of these topics (e.g., the keywords "newegg," "target," "fry's," "best buy," "lolicup," respectively) are merely part of a list of stores. As another example and not by way of limitation, the score for a topic like "New York" in a post listing numerous places visited by the author may be decreased. In particular embodiments, a topic-score of a topic referring to a place may by default be decreased, regardless of whether it is merely part of a list of places. In particular embodiments, a keyword may be removed from the list of extracted keywords, barring it from further consideration by social-networking system 160, if the keyword corresponds to a topic that is deemed not relevant. As an example and not by way of limitation, the keyword corresponding to the name of an author of a post may be deemed irrelevant. Referencing FIG. 3, the name of the author of post 320 (e.g., "john") may be removed from the list of extracted keywords. In particular embodiments, topics deemed irrelevant such as the name of the author may not be removed from the list of extracted keywords, and instead may only have their respective topic-scores decreased.

In particular embodiments, the topic-score may be based on a current popularity of the topic on the online social network. As an example and not by way of limitation, a topic-score may be increased based on a topic's popularity on the online social network as determined by, for example, the number of posts, shares, views, or likes associated with the topic on the online social network. As an example and not by way of limitation, referencing FIG. 3, a topic like "Black Friday" may be popular the week before Black Friday. As such, its topic-score may be increased in a post that was created the week before Black Friday. By contrast, the topic-score for "Black Friday" may not be similarly increased six months before Black Friday, since that topic may not be as popular on the online social network at that time. In particular embodiments, social-networking system 160 may increase the topic-score of a topic that is globally trending on the online social network. In particular embodiments, social-networking system 160 may decrease the topic-score of a topic that is not currently popular or is not globally trending. In particular embodiments, the social-networking system 160 may crawl an online index, database, or news source (e.g., Wikipedia.org, BBC.com, CNN.com) to determine the popularity of a topic. In particular embodiments, the topic-score may be based on a confidence level that the extracted keyword corresponds to the topic. The confidence level is a reflection of the confidence that social-networking system 160 has that an extracted keyword is in fact associated with a particular topic. The confidence level may be based on a context in which the extracted keyword is used in the post, which may be determined as described above (e.g., by using a forward-backward algorithm). As an example and not by way of limitation, in the case of a post with extracted keyword "sharks," social-networking system 160 may base the topic-score of "San Jose Sharks" on the confidence level that the extracted keyword "sharks" is associated with the San Jose Sharks ice hockey team and not with the fish, Selachimorpha (i.e., the scientific name for shark). The topic "San Jose Sharks" corresponding to the keyword "sharks" may receive a higher topic-score in a post including the text "watching the sharks game on tv" than in a post including the text "watching the sharks on tv." In the former case, social-networking system 160 may have a relatively high confidence level that the post is related to the topic "San Jose Sharks," because of the presence of the word "game" in the post (the forward-backward algorithm may determine that "sharks" and "game" both match the topic "San Jose Sharks"). In the latter case, however, social-networking system 160 may have a lower confidence level that the post is related to the topic "San Jose Sharks" and not the topic "Sharks (Selachimorpha)." In particular embodiments, the topic-score may be based on social signals (e.g., number of likes, shares, views) that may be found in the extracted metadata associated with a post or comment. As an example and not by way of limitation, the associated topic of a keyword extracted from the text of a comment with many likes may be given a higher topic-score than the associated topic of a keyword extracted from the text of an identical comment with fewer likes. In particular embodiments, the topic-score or the context-score of a topic may be based on the author's affinity for a topic. Social-networking system 160 may determine an author's affinity for a topic by calculating the author's affinity coefficient with respect to a concept representing the topic. As discussed in more detail below, the affinity coefficient may be based on, for example, joining a group, liking a page, viewing pages, or making posts related to the concept representing the topic. As an example and not by way of limitation, an author of a post who has liked a page associated with the San Jose Sharks may be determined to have a high affinity for the topic "San Jose Sharks" so that a post by the author including the keyword "sharks" may have an increased topic-score or context-score for the topic "San Jose Sharks." In particular embodiments, the topic-score or the context-score of a topic may be based on the author's demographics. As an example and not by way of limitation, the keyword "iggy" in a post by a younger author may result in a relatively high topic-score or context-score for the topic "Iggy Azalea" (a relatively new music artist), whereas the same keyword in a post by an older author may result in a higher topic-score for the topic "Iggy Pop" (an older music artist). In particular embodiments, the topic-score or the context-score of a topic may be based on the author's geographic location. As an example and not by way of limitation, the keyword "black friday" in a post by an author who lives in the United States may result in a higher topic-score or context-score for the topic "Black Friday" than the same keyword in a post by an author who lives in a country where Black Friday does not exist. Although this disclosure describes calculating the topic-score of a particular topic in a particular manner, this disclosure contemplates calculating the topic-score of any suitable topic in any suitable manner.

In particular embodiments, social-networking system 160 may generate a suggested keyword query corresponding to the post. The suggested keyword query may include one or more extracted keywords corresponding to each topic having a topic-score greater than a threshold topic-score. By contrast, extracted keywords corresponding to topics with topic-scores less than a topic threshold topic-score may not be included in the suggested keyword query. As an example and not by way of limitation, referencing FIG. 3, social-networking system 160 may generate suggested keyword query 360, which consists of two keywords ("black friday" and "deals") that may be associated with the two topics ("Black Friday" and "Deals") that have a topic-score greater than a threshold topic-score. In particular embodiments, the topic-score may be a rank and the threshold topic-score may be a threshold rank. As an example and not by way of limitation, the suggested keyword query may include only keywords corresponding to the top five topics. In particular embodiments, the suggested keyword query may include only the keywords most closely associated with topics having topic-scores higher than the threshold topic-score. Social-networking system 160 may determine the most closely associated keywords for a particular topic by considering the degree of separation between the keywords and the topic. As an example and not by way of limitation, referencing FIG. 3, there may be several keywords that are associated with the top-scoring topic "Black Friday" (e.g., "black friday," "tv," "best buy"), but the suggested keyword query may include only the keyword "black friday" because there may be only one degree of separation between the keyword "black friday" and the topic "Black Friday." By contrast there is at least one extra degree of separation between the keyword "best buy" and the topic "Black Friday" (e.g., keyword "best buy," to topic "Best Buy," to topic "Black Friday"). In particular embodiments, social-networking system 160 may also consider the affinity of topics for each other. For example, referencing FIG. 3, there may be a stronger affinity between the topics "Best Buy" and "Black Friday" than between "Lollicup" and "Black Friday" (e.g., because Best Buy is a store that is often associated with Black Friday deals, while Lollicup is not). In particular embodiments, the suggested keyword query may be limited to a fixed number of extracted keywords. As an example and not by way of limitation, the fixed number of extracted keywords may be set to three. In particular embodiments, when the number of keywords in the suggested keyword query is less than the fixed number of extracted keywords, the name of an author of the post (either the full name as listed on the online social network or a portion thereof) may be appended to the suggested keyword query. As an example and not by way of limitation, referencing FIG. 3, if the fixed number of extracted keywords is set to three, the name of the author of post 320 (e.g., "John") may be appended to suggested keyword query 360. The name may be appended to suggested keyword query 360 at any location within suggested keyword query 360. For example, referencing FIG. 3, the name of the author of post 320 may be appended to the beginning (e.g., "john black friday deals"), middle (e.g., "black friday john deals"), or end (e.g., "black friday deals john") of suggested keyword query 360. In particular embodiments, social-networking system 160 may generate a suggested structured query (e.g., a Graph Search query). The suggested structured query may include references to one or more nodes and one or more edges of the social graph 200. As an example and not by way of limitation, referencing FIG. 3, social-networking system 160 may generate a structured query such as "Posts by my friends about Black Friday." Although this disclosure describes generating a particular keyword query corresponding to a particular post in a particular manner, this disclosure contemplates generating any suitable keyword query corresponding to any suitable post in any suitable manner.

In particular embodiments, social-networking system 160 may send, to a client device of a user of the online social network for display, the post and the suggested keyword query corresponding to the post. Social-networking system 160 may send the post and the suggested keyword query to the user for display on a page of the online social network accessed by the user (e.g., a customized newsfeed page of the online social network). As an example and not by way of limitation, social-networking system 160 may, referencing FIG. 3, send post 320 and suggested keyword query 360 to a user's client device. In particular embodiments, social-networking system 160 may, referencing FIG. 3, send post 320, comment 330, social signals such as likes 380 or shares, and suggested keyword query 360. In particular embodiments, the suggested keyword query may consist of keywords matching words used in the post for which the suggested keyword query was displayed to the user (i.e., the original post), comments, or metadata, as is the case in FIGS. 3 and 4. In other embodiments, the suggested keyword may include keywords that may not have been in the original post, comments, or metadata, but are associated with the selected topics. As an example and not by way of limitation, referencing FIG. 4, suggested keyword query 460 may include the keyword "house of representatives" because social-networking system 160 may determine that the word "House" as used in post 420 (e.g., "House intelligence panel finds no intelligence failure . . . ") refers to the U.S. House of Representatives legislative body. In particular embodiments, the suggested keyword query may be displayed adjacent to the post. As an example and not by way of limitation, referencing FIG. 3, suggested keyword query 360 may be displayed within a box adjacent to the post (e.g., below the post). In particular embodiments, the suggested keyword query may display the keywords in an order based on the relative positions of the extracted keywords in the content of the post, comments, metadata, or any combination thereof. For example, referencing FIG. 3, the keyword "black friday" may appear in suggested keyword query 360 before the keyword "deals" due to the relative position of the two keywords (e.g., "Black Friday" appears before the word "deals" in the content of post 320, "Best Black Friday deals I found so far . . . "). In particular embodiments, the suggested keyword query may only be displayed in response to a user input. As an example and not by way of limitation, referencing FIG. 3, a suggested keyword query may be displayed only in response to a user selecting the chevron button in the upper-right corner of post 320. As an example and not by way of limitation, the suggested keyword query may be displayed within a dropdown menu under chevron button. In particular embodiments, the suggested keyword query may be a link that is selectable to execute a search query with the suggested keyword query as a parameter of the search. As an example and not by way of limitation, referencing FIG. 3, the user may click on a selectable suggested keyword query link that includes the entire suggested keyword query 360 (e.g., the suggested keyword query "black friday deals") and social-networking system 160 may, in response, execute a search query with "black friday deals" as a parameter of the search. In particular embodiments, each keyword in the suggested keyword query may be a link that is selectable to execute a search query with the selected keyword as a parameter of the search. As an example and not by way of limitation, referencing FIG. 3, the user may click on the selectable keyword link "black friday" in suggested keyword query 360 and social-networking system 160 may, in response, execute a search query with "black friday" as a parameter of the search. In particular embodiments, social-networking system 160 may send, to a client device of a user of the online social network, instructions for display, indicating that the suggested keyword query corresponding to the post may be used to find the same post again or to find related posts. As an example and not by way of limitation, referencing FIG. 3, social-networking system 160 may send instruction 370 for display, indicating to a user that post 320 may be found again by searching with suggested keyword query 360. As another example and not by way of limitation, referencing FIG. 4, social-networking system 160 may send instruction 470 for display, indicating to a user that posts related to post 420 may be found by searching with suggested keyword query 460. In particular embodiments, as an alternative to or in addition to a selectable suggested keyword query link, social-networking system 160 may display a button, link, or other activable element associated with a post that a user may select, click on, or otherwise activate in order to execute a search query with the suggested keyword query as a parameter of the search. As an example and not by way of limitation, referencing FIG. 4, next to the suggested keyword query "intelligence panel benghazi cia" could appear a button or link that reads "Related Posts", which could be activated to allow the user to search for related posts using the keyword query "intelligence panel benghazi cia".

In particular embodiments, social-networking system 160 may verify that the suggested keyword query retrieves the original post. In particular embodiments, social-networking system 160 may verify that the suggested keyword query retrieves one or more related posts by, for example, confirming that one or more retrieved posts contain a high incidence of topics that match the topics of the original post (e.g., a high incidence of a single matching topic, a high total incidence of multiple matching topics). The one or more retrieved posts may be verified as related posts if they have a threshold incidence of topics. In particular embodiments, social-networking system 160 may perform the verification process to determine what keyword query should be sent to the user as a suggested keyword query. Social-networking system 160, as part of this determination, may execute backend searches using several possible keyword queries to determine whether appropriate search results would appear if a search is conducted using a particular keyword query. As an example and not by way of limitation, search results may be appropriate if they include, near the top of the search results, a reference to the original post. As another example and not by way of limitation, search results may be appropriate if they include, near the top of the search results, references to related posts. In particular embodiments, social-networking system 160 may determine which search query would return the most appropriate search results. As an example and not by way of limitation, the most appropriate search results may include, in the very first search result, a reference to the original post. As another example and not by way of limitation, the most appropriate search results may include the highest number of references to related posts. Social-networking system 160 may iteratively test potential keyword queries, performing backend searches of different keyword queries, which may include different combinations of keywords corresponding to different combinations of topics, starting with the combinations of keyword queries containing combinations of topics with the highest topic-scores, until the most appropriate keyword query is found. As an example and not by way of limitation, in a post with the text "I love the San Francisco 49ers and Alex Smith," social-networking system 160, if the fixed number of extracted keywords is set to two, may perform backend search on combinations of the two topics with the highest topic-scores (e.g., "49ers" & "Alex Smith"; "Alex Smith" & "49ers") and find that a reference to the original post did not appear near the top of the search results. As a result, social-networking system 160 may move on to the next highest topic-score combination (e.g., "San Francisco" & "Alex Smith"; "Alex Smith" & "San Francisco") to verify that a reference to the original post would appear as the very first search result. Alternatively, social-networking system 160 may perform backend searches on several potential keyword queries simultaneously and select the most appropriate keyword query. As an example and not by way of limitation, social-networking system 160 may: (1) determine potential keyword queries by selecting keyword combinations of topics with high topic-scores, (2) execute backend searches with the potential keyword queries, and (3) select the keyword query that returns a reference to the post as the very first search result. As an example and not by way of limitation, referencing FIG. 4, if the fixed number of extracted keywords is set to the three, social-networking system 160 may simultaneously execute backend searches of keywords associated with topics having high topic-scores in different combinations of three keywords (e.g., "Benghazi, Libya" & "Benghazi Attack" & "House Intelligence Panel"; "House Intelligence Panel" & "Benghazi Attack" & "Central Intelligence Agency") in each backend search. When the most appropriate keyword query is found, social-networking system 160 may send that keyword query to the user as a suggested keyword query. Although this disclosure describes sending, to a particular device, a particular post and a particular keyword query in a particular manner, this disclosure contemplates sending, to any suitable device, any suitable post and any suitable keyword in any suitable manner.

In particular embodiments, social-networking system 160 may receive, from a user's client device, a search query comprising the suggested keyword query. Social-networking system 160 may, in response, generate one or more search results for display to the user that include references to one or more posts of the online social network matching the suggested keyword query. In particular embodiments, social-networking system 160 may keep track of one or more original posts for which a suggested keyword query was sent to a user and associate the original posts with their respective keyword search queries. Social-networking system 160 may determine that the generated search results are appropriate by verifying that the very first search result includes a reference to the original post. If that is not the case, social-networking system 160 may retroactively include a reference to the original post in the search results. As an example and not by way of limitation, referencing FIG. 3, social-networking system 160 may keep track of post 320 and its associated suggested keyword query 360 (e.g., "black friday deals") that was sent to a user who viewed the post. When the user later searches with suggested keyword query 360 (e.g., by sending "black friday deals" as a search query to social-networking system 160), social-networking system 160 may verify that the very first search result includes a reference to post 320. If the very first search result does not include a reference to post 320, social-networking system 160 may retroactively include a search result with a reference to post 320 as the first search result. In particular embodiments, the search results may include references to one or more posts of the online social network matching the suggested keyword query, wherein at least one of the referenced posts is a post related to the original post. In particular embodiments, social-networking system 160 may determine related posts by comparing the topics of the posts referenced in the search results with the topics of the original post. In particular embodiments, social-networking system 160 may determine related posts by determining the one or more topics associated with the suggested keyword query and finding posts with matching topics. In determining the one or more topics associated with the suggested keyword query, social-networking system 160 may first determine the context of each keyword in the suggested keyword query. The context of each keyword may be determined just as the context of extracted keywords from a post or comment is determined when generating a suggested keyword query (e.g., by using a forward-backward algorithm with the keywords of the suggested keyword query). As an example and not by way of limitation, referencing FIG. 4, social-networking system 160, in determining a topic associated with the keyword "cia" (e.g., determining whether it is associated with the topic "Central Intelligence Agency" or with the topic "Culinary Institute of America") may look for the presence of matching topics associated with adjacent keywords in suggested keyword query 460 (e.g., "intelligence panel" & "benghazi"). Social-networking system 160 may find that the adjacent keywords in suggested keyword query 460 (e.g., "intelligence panel" & "benghazi") have more matching topics with "Central Intelligence Agency" than with "Culinary Institute of America" and may as a result determine that "cia" is associated with "Central Intelligence Agency." Once the one or more topics associated with a suggested keyword query have been determined, social-networking system 160 may find related posts by finding posts with high occurrences of matching topics. In particular embodiments, social-networking system 160 may determine the order of displaying the generated search results based in part on the relationship between the author and the user who sent the search query. As an example and not by way of limitation, social-networking system 160 may include among the top search results the search results with references to posts by authors who are first-degree friends of the user on the online social network. For example, referencing FIG. 4, a user may enter suggested keyword query 460 (e.g., "intelligence panel benghazi cia") and social-networking system 160 may, in response, generate search results that include references to related posts. Social-networking system 160 may include, among the top search results, a search result with a reference to a post by the user's friend on the same issue (e.g., a post with a link to another article on the House intelligence Panel's finding on the 2012 Benghazi attack or a post generally commenting on the issue). In particular embodiments, as discussed above, social-networking system 160 may provide customized keyword completion suggestions to a querying user as the user is inputting a text string into a query field. In order to generate a keyword completion suggestion, social-networking system 160 may access a store of suggested keyword queries previously displayed to the user, score them based on how much they match the characters already entered by the user, and then return the keyword completion suggestions to the user. Social-networking system 160 may use one or more matching algorithms to score the accessed suggested keyword queries. In particular embodiments, social-networking system 160 may display a drop-down menu that displays the suggested keyword queries, among which the user may confirm one or more keyword queries to be executed. Social-networking system 160, in response to the confirmed keyword query, may then generate the appropriate search results. As an example, and not by way of limitation, referencing FIG. 3, if a user to whom suggested keyword query 360 (e.g., "black friday deals") had already been displayed later begins to input the keyword "black friday" (e.g., "black fr"), social-networking system 160 may display a drop-down menu that displays suggested keyword query 360, which may then be confirmed by the user for execution as a search query. In particular embodiments, social-networking system 160 may auto-populate the query field with the suggested keyword query that is the closest match. The user may then confirm the auto-populated suggested keyword query to be executed simply by, for example, keying "enter" on a keyboard or by clicking on the auto-populated declaration. Social-networking system 160 may then generate the appropriate search results. In particular embodiments, social-networking system 160 may display a drop-down menu that displays the suggested keyword queries and also auto-populate the query field with the suggested keyword query that is the closest match. In particular embodiments, a reference to an object (e.g., a post) may only be generated as a search result if the querying user is authorized by the author to access the object. As an example and not by way of limitation, referencing FIG. 3, if the author of post 320 had limited the access to post 320 to only friends of the author on the online social network, social-networking system 160 may not show post 320 to a user who sends a search query consisting of suggested keyword query 360 if the user is not a friend of the author on the online social network. In particular embodiments, the one or more search results generated by social-networking system 160 may be displayed to the user on a separate search-results page. In particular embodiments, the one or more search results may be displayed to the user within the same page as the original post. As an example and not by way of limitation, the search results may be displayed at a location adjacent to the original post (e.g., within a horizontal scroll unit below the original post that the user can navigate to find a particular related post). In particular embodiments, social-networking system 160 may, in response to a user accessing a page that includes a post, immediately generate search results corresponding to the post that include, for example, references to related posts. Social-networking system 160 may display these search results within the same page as the original post (e.g., at a location adjacent to the post), allowing the user to immediately find related posts. For example, referencing FIG. 3, in response to a user accessing a newsfeed page that includes post 320, social-networking system 160 may immediately generate search results that include references to other related posts (e.g., other posts about Black Friday or Black Friday Deals). These search results may be displayed within a horizontal scroll unit below post 320, allowing the user to find a particular referenced related post by navigating the scroll unit and clicking on a corresponding reference. Although this disclosure describes receiving particular search queries and in response generating particular search results in a particular manner, this disclosure contemplates receiving any suitable search query and in response generating any suitable search results in any suitable manner.

Figure 5:
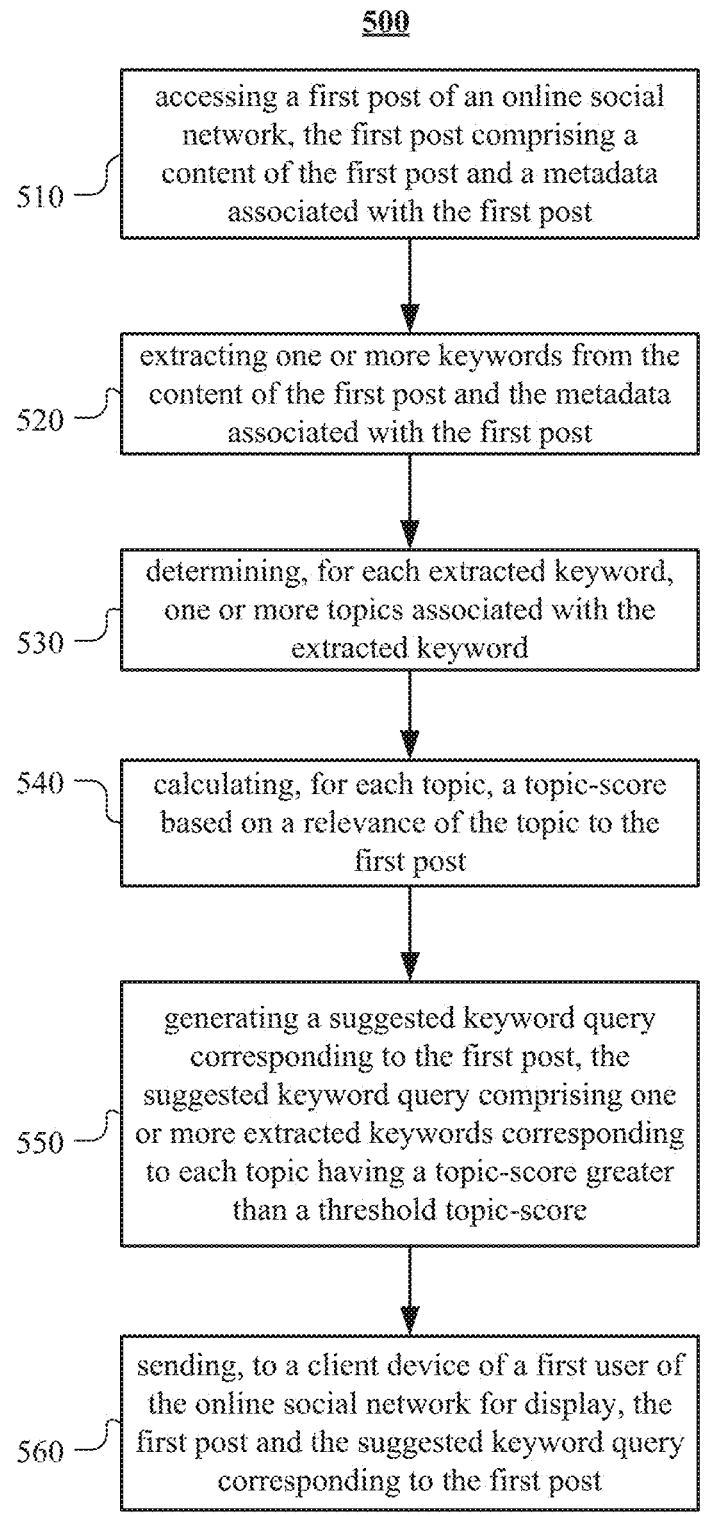
FIG. 5 illustrates an example method for generating and sending keyword query suggestions to a user of an online social network

FIG. 5 illustrates an example method 500 for generating and sending keyword query suggestions to a user of an online social network. The method may begin at step 510, where social-networking system 160 may access a first post of an online social network. The first post may comprise a content of the first post and a metadata associated with the first post. At step 520, social-networking system 160 may extract one or more keywords from the content of the first post and the metadata associated with the first post. At step 530, social-networking system 160 may determine, for each extracted keyword, one or more topics associated with the extracted keyword. At step 540, social-networking system 160 may calculate, for each topic, a topic-score based on a relevance of the topic to the first post. At step 550, social-networking system 160 may generate a suggested keyword query corresponding to the first post. The suggested keyword query may comprise one or more extracted keywords corresponding to each topic having a topic-score greater than a threshold topic-score. At step 560, social-networking system 160 may send, to a client device of a first user of the online social network for display, the first post and the suggested keyword query corresponding to the first post. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for generating and sending keyword query suggestions to a user of an online social network including the particular steps of the method of FIG. 5, this disclosure contemplates any suitable method for generating and sending keyword query suggestions to a user of an online social network including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Social Graph Affinity and Coefficient

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part based on a the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system

160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Systems and Methods

Figure 6:
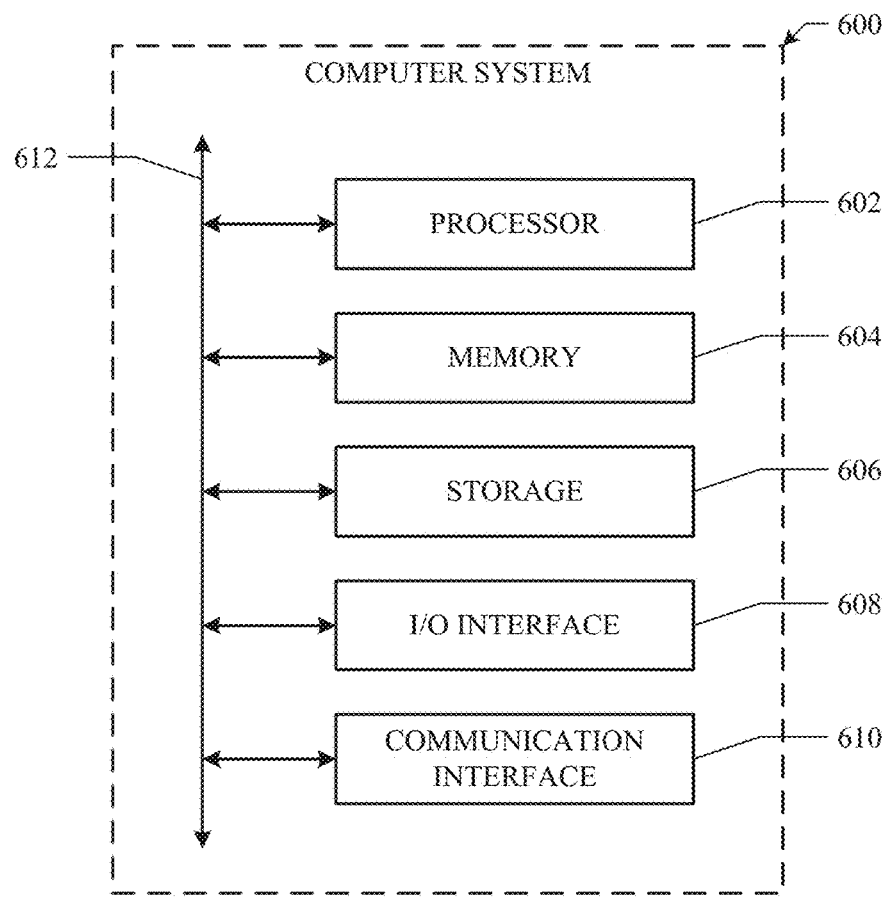
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method for improving search query suggestions comprising, by one or more computing devices:

accessing a first post of an online social network, the first post comprising a content of the first post and a metadata associated with the first post;

extracting a plurality of keywords from the content of the first post and the metadata associated with the first post;

determining, for each extracted keyword of the first post, one or more topics associated with the extracted keyword;

calculating, for each topic associated with the extracted keywords of the first post, a topic-score based on a relevance of the topic to the first post;

determining, from the topics associated with the extracted keywords of the first post, one or more relevant topics for the first post, wherein each relevant topic has a topic-score greater than a threshold topic-score;

selecting a plurality of keywords from the extracted keywords of the first post, each of the selected keywords corresponding to one or more of the relevant topics;

generating a suggested keyword query corresponding to the first post, the suggested keyword query comprising the selected keywords of the first post;

determining that a total number of the selected keywords of the first post in the suggested keyword query is less than a predetermined number of keywords, wherein the predetermined number of keywords is at least two keywords;

in response to determining that the total number of the selected keywords of the first post in the suggested keyword query is less than the predetermined number of keywords, modifying the suggested keyword query to include at least a portion of a name of an author of the first post; and sending, to a client device of a first user of the online social network, information configured to render an interface comprising the first post and the modified suggested keyword query, wherein the first post is displayed in association with the modified suggested keyword query.

2. The method of claim 1, further comprising:
accessing a social graph comprising a plurality of nodes and a plurality of edges connecting the nodes, each of the edges between two of the nodes representing a single degree of separation between them, the nodes comprising:
a first node corresponding to the first user; and
a plurality of second nodes corresponding to a plurality of posts associated with the online social network, respectively.

3. The method of claim 1, wherein determining, for each extracted keyword, the one or more topics associated with the extracted keyword comprises:
receiving an electronic topic index comprising a set of objects, wherein each object represents a topic;
determining a context of the extracted keyword in the first post;
calculating a context-score for each object of the set of objects based on the determined context; and
determining whether there is an object having a context-score greater than a threshold context-score.

4. The method of claim 3, wherein the context of the extracted keyword in the first post is determined using a forward-backward algorithm to calculate a probability of the extracted keyword matching the topic based on adjacent n-grams that match the topic also being present.

5. The method of claim 1, wherein the relevance of the topic to the first post is based on an overall context of the first post.

6. The method of claim 1, wherein the topic-score is further based on a current popularity of the topic on the online social network.

7. The method of claim 1, wherein the topic-score is further based on a confidence level that a particular extracted keyword associated with the topic corresponds to the topic, the confidence level being based on a context in which the particular extracted keyword is used in the post.

8. The method of claim 1, wherein extracting the plurality of keywords comprises filtering out one or more n-grams from the content of the first post having a low relevance based on a TF-IDF analysis.

9. The method of claim 1, further comprising removing a name of an author of the first post from the extracted keywords.

10. The method of claim 1, wherein the suggested keyword query comprises a fixed number of extracted keywords.

11. The method of claim 1, further comprising sending instructions for display indicating that the modified suggested keyword query corresponding to the first post can be used to find the first post again or to find related posts.

12. The method of claim 1, wherein the modified suggested keyword query is displayed adjacent to the first post.

13. The method of claim 1, wherein the extracted keywords in the modified suggested keyword query are displayed in an order based on a relative position of the extracted keywords in the content of the first post.

14. The method of claim 1, wherein the suggested keyword is a link that is selectable to execute a search query comprising the modified suggested keyword query.

15. The method of claim 1, further comprising verifying that the suggested keyword query retrieves the first post in response to executing the modified suggested keyword query.

16. The method of claim 1, further comprising:
receiving, from the client device of the first user, a search query comprising the modified suggested keyword query; and
generating one or more search results comprising references to one or more posts of the online social network matching the modified suggested keyword query, wherein at least one of the search results comprises a reference to the first post.

17. The method of claim 1, further comprising:
receiving, from the client device of the first user, a search query comprising the modified suggested keyword query; and
generating one or more search results comprising references to one or more second posts of the online social network matching the modified suggested keyword query, wherein at least one of the second posts is a related post.

18. One or more computer-readable non-transitory storage media embodying software for improving search query suggestions, the software operable when executed to:
access a first post of an online social network, the first post comprising a content of the first post and a metadata associated with the first post;
extract a plurality of keywords from the content of the first post and the metadata associated with the first post;
determine, for each extracted keyword of the first post, one or more topics associated with the extracted keyword;
calculate, for each topic associated with the extracted keywords of the first post, a topic-score based on a relevance of the topic to the first post;
determine, from the topics associated with the extracted keywords of the first post, one or more relevant topics for the first post, wherein each relevant topic has a topic-score greater than a threshold topic-score;
selecting a plurality of keywords from the extracted keywords of the first post, each of the selected keywords corresponding to one or more of the relevant topics;
generate a suggested keyword query corresponding to the first post, the suggested keyword query comprising the selected keywords of the first post;
determine that a total number of the selected keywords of the first post in the suggested keyword query is less than a predetermined number of keywords, wherein the predetermined number of keywords is at least two keywords;
in response to determining that the total number of the selected keywords of the first post in the suggested keyword query is less than the predetermined number of keywords, modify the suggested keyword query to include at least a portion of a name of an author of the first post; and
send, to a client device of a first user of the online social network, information configured to render an interface comprising the first post and the modified suggested keyword query, wherein the first post is displayed in association with the modified suggested keyword query.

19. A system comprising: one or more processors; and a non-transitory memory coupled to the processors comprising instructions executable by the processors for improving search query suggestions, the processors operable when executing the instructions to:

access a first post of an online social network, the first post comprising a content of the first post and a metadata associated with the first post;

extract a plurality of keywords from the content of the first post and the metadata associated with the first post;

determine, for each extracted keyword of the first post, one or more topics associated with the extracted keyword;

calculate, for each topic associated with the extracted keywords of the first post, a topic-score based on a relevance of the topic to the first post;

determine, from the topics associated with the extracted keywords of the first post, one or more relevant topics for the first post, wherein each relevant topic has a topic-score greater than a threshold topic-score;

selecting a plurality of keywords from the extracted keywords of the first post, each of the selected keywords corresponding to one or more of the relevant topics;

generate a suggested keyword query corresponding to the first post, the suggested keyword query comprising the selected keywords of the first post;

determine that a total number of the selected keywords of the first post in the suggested keyword query is less than a predetermined number of keywords, wherein the predetermined number of keywords is at least two keywords;

in response to determining that the total number of the selected keywords of the first post in the suggested keyword query is less than the predetermined number of keywords, modify the suggested keyword query to include at least a portion of a name of an author of the first post; and send, to a client device of a first user of the online social network, information configured to render an interface comprising the first post and the modified suggested keyword query, wherein the first post is displayed in association with the modified suggested keyword query.

20. The method of claim 1, wherein the first post has been tagged with one or more topics, and wherein the topic-score for each topic associated with the extracted keywords is further based on a relevance of the topic to the one or more topics tagged in the first post.

21. The media of claim 18, wherein the software is further operable when executed to:
accessing a social graph comprising a plurality of nodes and a plurality of edges connecting the nodes, each of the edges between two of the nodes representing a single degree of separation between them, the nodes comprising:
a first node corresponding to the first user; and
a plurality of second nodes corresponding to a plurality of posts associated with the online social network, respectively.

22. The media of claim 18, wherein the software, when executed to determine, for each extracted keyword, the one or more topics associated with the extracted keyword, is further operable to:
receive an electronic topic index comprising a set of objects, wherein each object represents a topic;
determine a context of the extracted keyword in the first post;
calculate a context-score for each object of the set of objects based on the determined context; and
determine whether there is an object having a context-score greater than a threshold context-score.

23. The media of claim 22, wherein the context of the extracted keyword in the first post is determined using a forward-backward algorithm to calculate a probability of the extracted keyword matching the topic based on adjacent n-grams that match the topic also being present.

24. The media of claim 18, wherein the relevance of the topic to the first post is based on an overall context of the first post.

25. The media of claim 18, wherein the topic-score is further based on a current popularity of the topic on the online social network.

26. The media of claim 18, wherein the topic-score is further based on a confidence level that a particular extracted keyword associated with the topic corresponds to the topic, the confidence level being based on a context in which the particular extracted keyword is used in the post.

27. The media of claim 18, wherein the software, when executed to extract the plurality of keywords, is further operable to filter out one or more n-grams from the content of the first post having a low relevance based on a TF-IDF analysis.

28. The media of claim 18, wherein the software is further operable when executed to remove a name of an author of the first post from the extracted keywords.

29. The media of claim 18, wherein the suggested keyword query comprises a fixed number of extracted keywords.

30. The media of claim 18, wherein the software is further operable when executed to send instructions for display indicating that the modified suggested keyword query corresponding to the first post can be used to find the first post again or to find related posts.

31. The media of claim 18, wherein the modified suggested keyword query is displayed adjacent to the first post.

32. The media of claim 18, wherein the extracted keywords in the modified suggested keyword query are displayed in an order based on a relative position of the extracted keywords in the content of the first post.

33. The media of claim 18, wherein the suggested keyword is a link that is selectable to execute a search query comprising the modified suggested keyword query.

34. The media of claim 18, wherein the software is further operable when executed to verify that the suggested keyword query retrieves the first post in response to executing the modified suggested keyword query.

35. The media of claim 18, wherein the software is further operable when executed to:
receive, from the client device of the first user, a search query comprising the modified suggested keyword query; and
generate one or more search results comprising references to one or more posts of the online social network matching the modified suggested keyword query, wherein at least one of the search results comprises a reference to the first post.

36. The media of claim 18, wherein the software is further operable when executed to:
receive, from the client device of the first user, a search query comprising the modified suggested keyword query; and
generate one or more search results comprising references to one or more second posts of the online social network matching the modified suggested keyword query, wherein at least one of the second posts is a related post.

* * * * *